(12) United States Patent
Pirooz (10) Patent No.: US 7,705,639 B1
(45) Date of Patent: Apr. 27, 2010

(54) METHOD AND APPARATUS FOR HIGH PERFORMANCE AUTOMATIC FREQUENCY CONTROL IN A WIRELESS RECEIVER

(75) Inventor: Ali Dolatshahi Pirooz, Fremont, CA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 12/338,760

(22) Filed: Dec. 18, 2008

(51) Int. Cl.
*H03B 19/00* (2006.01)
(52) U.S. Cl. .................................. 327/113; 327/114
(58) Field of Classification Search ......... 327/113–115, 327/117, 118, 165, 166
See application file for complete search history.

(56) References Cited

U.S. PATENT DOCUMENTS

| | | | |
|---|---|---|---|
| 5,900,751 A * | 5/1999 | Kuwabara | 327/113 |
| 6,362,668 B1 * | 3/2002 | Lutley et al. | 327/113 |
| 6,710,635 B1 * | 3/2004 | Wilson | 327/156 |

OTHER PUBLICATIONS

Silicon Laboratories Inc., "Si4330 EZRadioPRO™," https://www.silabs.com/products/wireless/EZRadioPRO/Pages/Si4330.aspx, 2008, 1 page.

* cited by examiner

*Primary Examiner*—Hai L Nguyen
(74) *Attorney, Agent, or Firm*—O'Keefe, Egan, Peterman & Enders LLP (57) ABSTRACT

An apparatus and a method are disclosed wherein a clock generator component converts a received clock signal into a plurality of internal clock signals which are skewed in time, a phase difference component computes phase differences at subsequent clock phases of a received phase signal, an intermediate averaging component receives each phase difference signals and outputs their average, a threshold detection component detects steady phase changes and activates a preamble detect signal which is used to clock an output filter that smoothes the output from the intermediate averaging component. The output is a frequency correction signal that is used by a wireless receiver to correct its reception process. The disclosed invention merges the frequency correction process more quickly and accurately, is less likely to trigger on noise and has a lower packet error rate than conventional systems.

20 Claims, 7 Drawing Sheets

METHOD AND APPARATUS FOR HIGH PERFORMANCE AUTOMATIC FREQUENCY CONTROL IN A WIRELESS RECEIVER

FIELD OF THE INVENTION

This invention pertains to wireless receivers and wireless receiver technology, and more particularly to short range wireless systems that utilize phase modulation.

BACKGROUND OF THE INVENTION

Figure 1:
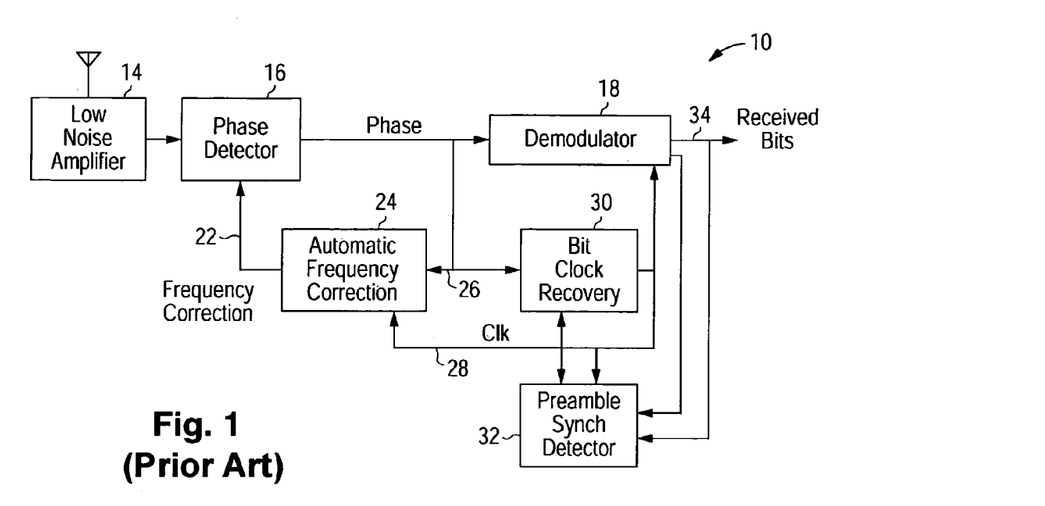
FIG. 1 is a block diagram of a conventional wireless receiver system 10.

Conventional methods and devices to build a wireless receiver are generally known. FIG. 1 depicts a block diagram of a conventional wireless receiver 10 that receives data packets. The received signal arrives at antenna 12 and is amplified by low noise amplifier 14 where the output is fed into a phase detector 16 that compares the phase of the received signal with the frequency correction signal 22. The difference is output as phase signal 26, which connects to the automatic frequency correction component 24. The negative feedback provided by the automatic frequency correction component 24 to the phase detector 16 allows the frequency correction process to merge until it matches the rate of the clock embedded in the received transmission. The demodulator 18, bit clock recovery 30, and preamble synch detector 32 play a supporting role in the frequency correction process and may generate additional signals, such as the clock signal 28, to be used by the automatic frequency correction component 24.

Figure 2:
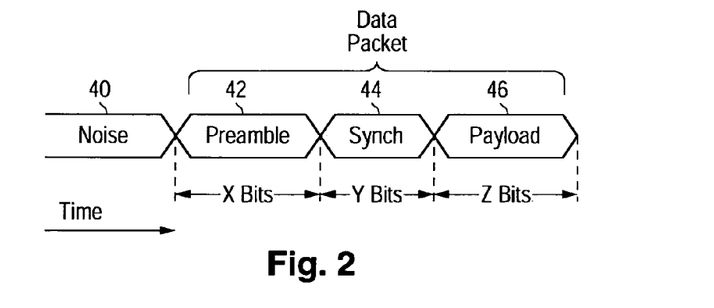
FIG. 2 is an illustration of the transmission received at the wireless receiver system.

The received data packets may be preceded by the reception of noise. Referring to FIG. 2, which is a timing diagram illustrating an example of data packet reception, the received signal starts with purely noise 40, and then a data packet is received. The data packet may begin with a preamble 42 as shown in FIG. 2, which is typically followed by a synchronization field 44 and then the data payload 46. Note that the preamble 42 typically has an embedded clock signal, such as an alternating sequence of zeroes and ones. As part of the reception process, the wireless receiver must merge its clock with clocking information present in the received data packet.

Conventional automatic frequency control suffers from several difficulties. The noise received before a packet may sometimes falsely trigger the automatic frequency correction component 24, which often results in a greater degree of inaccuracy of frequency correction. This can, in turn, result in more error packets. Conventional automatic frequency correction suffers from slow merge times, resulting in more lost packets when the merge is not accomplished before the payload arrives. The wireless receiver must merge its clock with clocking information present in the received data packet quickly, ideally before the end of the reception of the preamble. It must not falsely trigger based on a noise input. A need exists for an improved method and apparatus for automatic frequency correction that addresses these issues.

BRIEF SUMMARY OF THE INVENTION

An embodiment of an automatic frequency correction component, in accordance with one aspect of the present invention, includes a clock generator circuit to convert a received clock signal into a plurality of internal clock signals that operate at a fraction of the rate of the clock signal and are skewed uniformly in time, where each of the internal clock signals are separated by a fixed clock time interval and a sum of the fixed clock time intervals equals the cycle time interval of the clock generator. A plurality of sample and hold elements, each receiving one of the plurality of internal clock signals and the phase signal, samples the phase signal responsive to each internal clock signal to obtain a corresponding plurality of sampled phase signals. Each of a plurality of delay elements stores one of the plurality of sampled phase signals responsive to a corresponding one of the internal clock signals in order to output a corresponding one of a plurality of delayed phase signals. Each of a plurality of accumulators receives one of the delayed phase signals and a corresponding one of the sampled phase signals and computes a difference responsive thereto in order to output a corresponding one of a plurality of phase difference signals. An intermediate averaging component receives the plurality of phase difference signals and generates an intermediate average of the phase difference signals responsive to the received clock signal. A threshold detector receives the phase difference signals, generates a difference between multiple phase difference signals responsive to the clock signal, and compares the difference between multiple phase difference signals to a first threshold in order to detect a series of substantially equal consecutive phase differences and activate a detect signal responsive thereto. An output filter receives the intermediate average of the phase difference signals and filters the intermediate average responsive to the detect signal in order to generate the frequency correction signal.

An embodiment of a method for automatic frequency correction according to the present invention, wherein a phase signal input is converted to a frequency correction signal, involves converting a received clock signal into a plurality of internal clock signals that operate at a fraction of the rate of the clock signal and are skewed uniformly in time, each of the internal clock signals being separated by a fixed clock time interval, and where a sum of the fixed clock time intervals equals twice a period of the received clock signal. The method calls for sampling and holding a phase signal responsive to each of the internal clock signals to obtain a corresponding plurality of sampled phase signals. The method also calls for delaying each of the sampled phase signals, where each sampled phase signal is clocked by a corresponding one of the internal clock signals, to produce a corresponding plurality of delayed phase signals. The method further involves subtracting each of the delayed phase signals from a corresponding one of the sampled phase signals to produce a corresponding plurality of phase difference signals and generating an intermediate average of the phase difference signals responsive to the received clock signal. The method also sets forth comparing a magnitude of a difference between multiple phase difference signals to a first threshold responsive to the received clock signal in order to detect a series of substantially equal consecutive phase differences and activate a detect signal responsive thereto. Finally, the method recites filtering the intermediate average of the phase difference signals responsive to the detect signal to generate the frequency correction signal.

DETAILED DESCRIPTION OF THE INVENTION

The wireless receiver and methods described below, generally merge the frequency correction process more quickly and accurately than conventional systems. It is generally able to complete the merge during reception of the preamble 42. It is less likely to trigger on noise and less likely to drop packets. It has a lower packet error rate than conventional systems.

Figure 3:
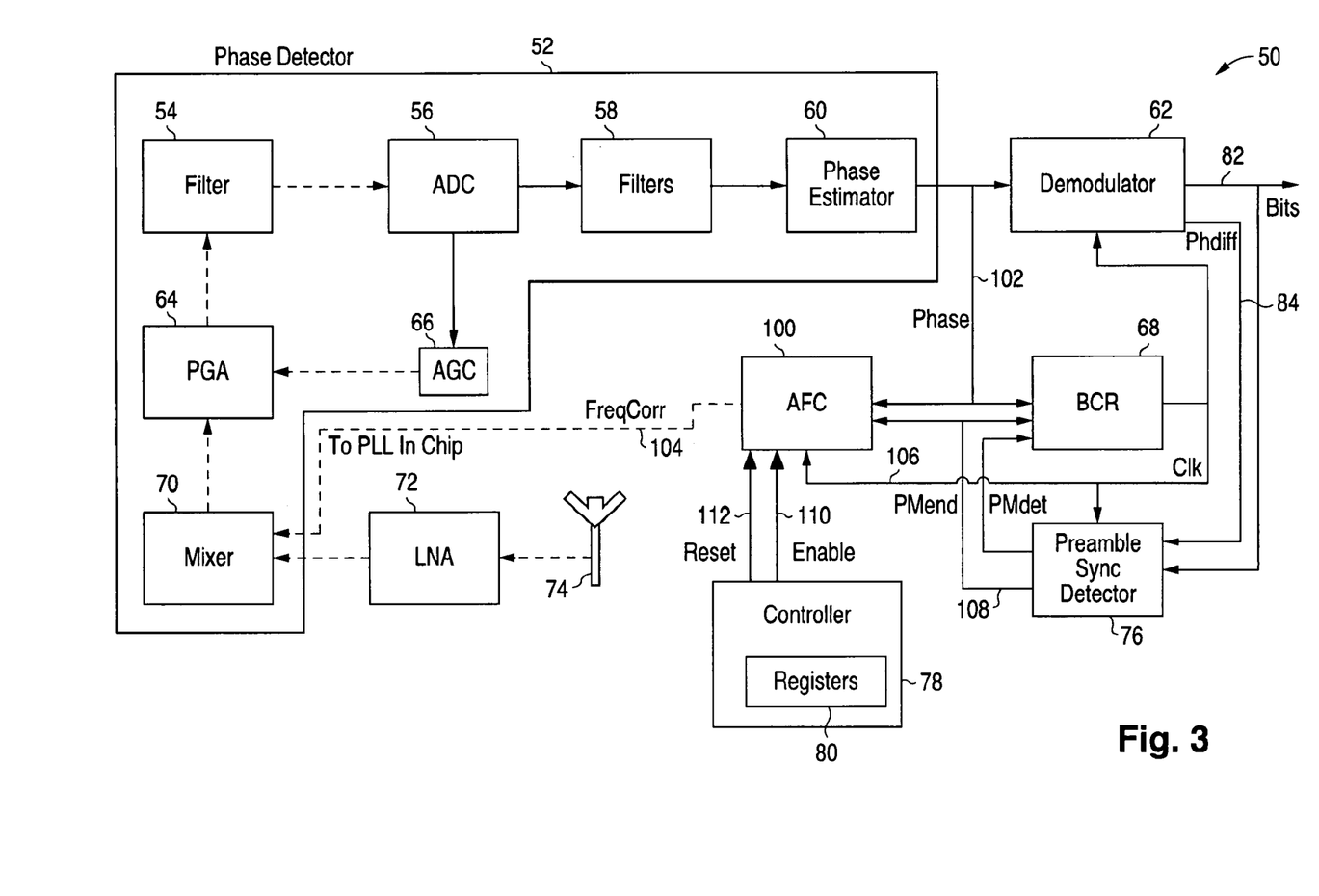
FIG. 3 is a block diagram of a preferred embodiment of the wireless receiver system 50.

An embodiment of the present invention is illustrated in the block diagram of FIG. 3. The wireless receiver system 50 receives data packets that are modulated with a modulation scheme such as GFSK, FSK or another modulation scheme. The received signal arrives at antenna 74 and is amplified by low noise amplifier 72 where the output is fed into a phase detector 52 that compares the phase of the received signal with the frequency correction signal 104 which is also referred to as FreqCorr. The difference is output as phase signal 102, which connects to the automatic frequency correction component 100. The negative feedback provided by the automatic frequency correction component 100 to the phase detector 52 allows the frequency correction process to merge until it matches the rate of the clock embedded in the received transmission.

In this embodiment, the phase detector component 52 is comprised of several elements: Mixer 70 includes the function of combining the amplified received signal from the low noise amplifier (LNA) 72. The programmable gain amplifier (PGA) 64 amplifies the output of the mixer 70 under the control of the automatic gain control (AGC) 66. The PGA output 64 is filtered using anti aliasing analog filter 54, and then converted to a digital signal using analog to digital converter (ADC) 56. The ADC 56 output is filtered using decimation digital filters 58 and then fed to the phase estimator 60 which produces the phase output signal 102. This is just one embodiment of the design of the phase detector component 52, and does not preclude other approaches. For example, in another embodiment, the phase detector may output an analog phase signal 102 rather than a digital signal.

The demodulator 62, bit clock recovery (BCR) 68, and preamble synch detector 76 play a supporting role in the frequency correction process and in this embodiment, they generate additional signals used by the automatic frequency correction component (AFC) 100. These signals are clock signal 106, and the preamble end signal also referred to as PMend 108. A controller 78 guides the overall operation of the wireless receiver 50. It supervises the start up procedure and can reset the automatic frequency correction component 100 using reset signal 112. It generates enable signal 110, which enables operation of the automatic frequency correction component 100. Controller 78 also incorporates registers that can be used to configure various parameter values that are made available and can be used by other components of the wireless receiver 50 such as the automatic frequency correction component 100.

Figure 4:
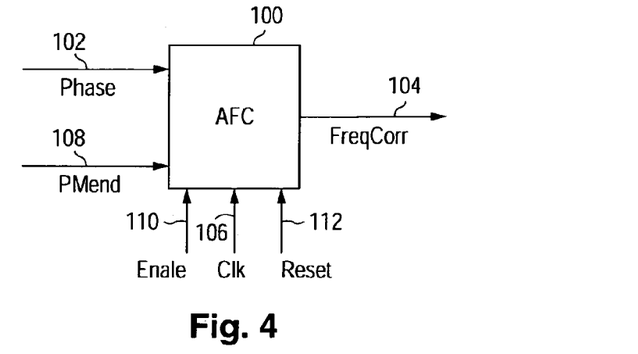
FIG. 4 is an input-output diagram of a preferred embodiment the automatic frequency correction component 100 of the wireless receiver system 50.

The essence of the present invention lies in the operation of the automatic frequency correction component 100. FIG. 4 illustrates the input and output signals that connect the automatic frequency correction component 100 within the wireless receiver 50. The main purpose of automatic frequency correction component 100 is to analyze the phase input signal 102 and as quickly as possible produce an accurate FreqCorr 104 output signal. In the preferred embodiment, both phase 102 and FreqCorr 104 are digital signals indicating a magnitude such as by using a bus or group of binary signals. In other embodiments these signals may be of different types such as analog.

Input signal clk 106 is the primary clock used control registers in the automatic frequency correction component 100. Input signal PMend 108 indicates when the end of the preamble is detected. Input signal reset 112 is used to reset the automatic frequency correction component 100, and input signal enable 110 is used to enable operation of the automatic frequency correction component 100. In the preferred embodiment, signals clk 106, PMend 108, reset 112, and enable 110 are binary signals. In other embodiments they may be of different types such as analog.

Figure 5:
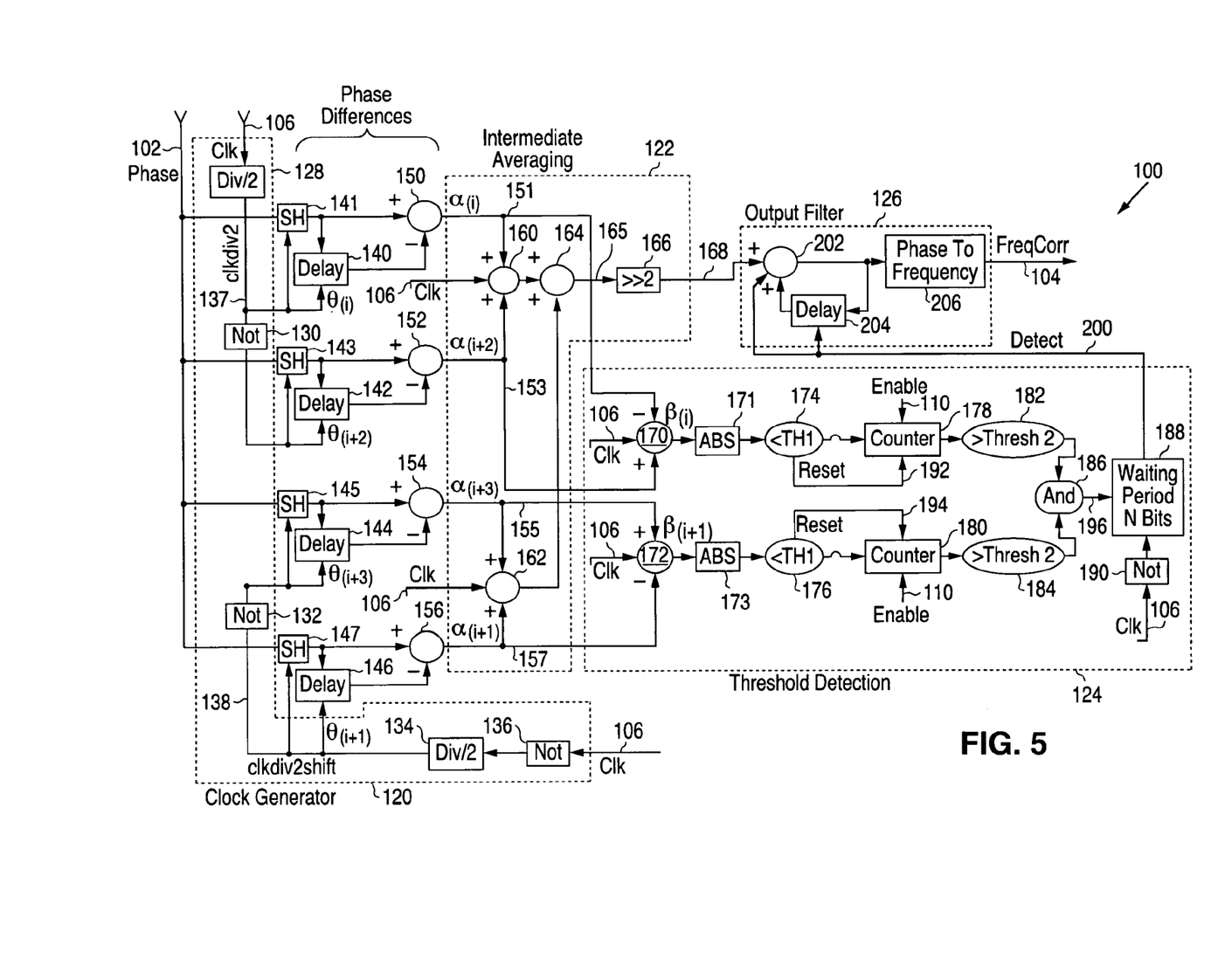
FIG. 5 is a detailed block diagram of a preferred embodiment of the automatic frequency correction component 100 of the wireless receiver 50.

FIG. 5 is a detailed block diagram of a preferred embodiment of the automatic frequency correction component 100 of the wireless receiver 50. The clock generator component 120 is comprised of divider elements that divide by 2 and not gates which are also referred to as inverters. Clk 106 connects to divide by 2 element 128 to produce internal clock signal clkdiv2 137 which also clocks delay element 140 and sample and hold element 141. Clkdiv2 connects to not gate 130 to produce the inverse of clkdiv2 which clocks delay element 142 and sample and hold element 143. Clk 106 connects to not gate 136 followed by divide by 2 element 134 to produce internal clock signal clkdiv2shift 138 which also clocks delay element 146 and sample and hold element 147. Clkdiv2shift 138 connects to not gate 132 to product the inverse of clkdiv2shift, which is used to clock delay element 144 and sample and hold element 145.

Figure 6:
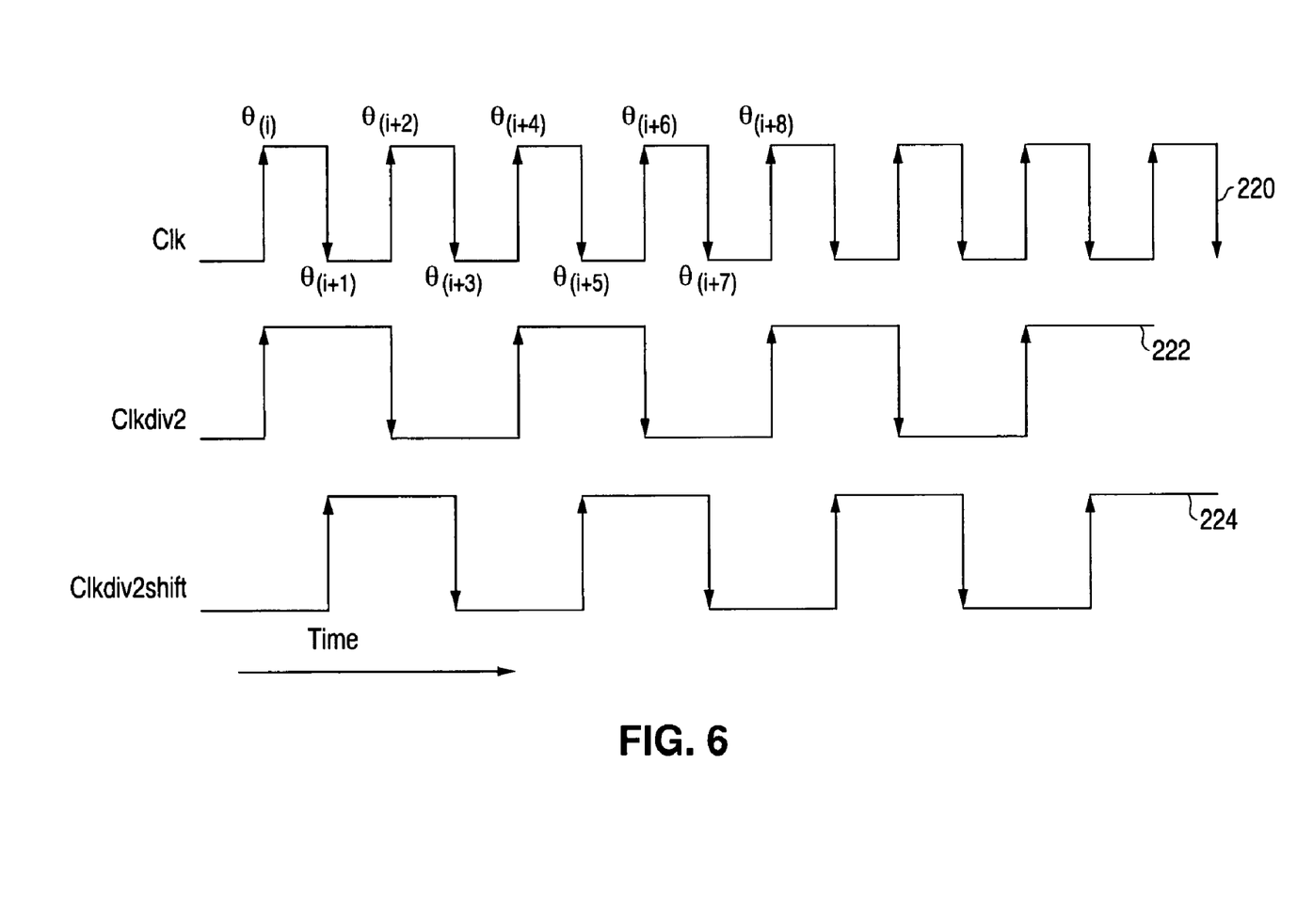
FIG. 6 is a diagram of the clock signal waveforms in a preferred embodiment of the automatic frequency correction component 100.

In this way, the four sample and hold elements 141, 147, 143, and 145, and four delay element 140, 146, 142, and 144 are clocked by internal clocks that activate at phase angles $\theta_{(i)}$, $\theta_{(i+1)}$, $\theta_{(i+2)}$, and $\theta_{(i+3)}$ respectively. FIG. 6 is an illustration of the clock generator 120 waveforms. In the preferred embodiment, signal clk 106 varies in time as shown in waveform 220. It has a 50 percent duty cycle. Each subsequent rising and falling edge of clk 106 marks the time of phase angles $\theta_{(i)}$, $\theta_{(i+1)}$, $\theta_{(i+2)}$, . . . and so forth. These phases mark fixed clock time intervals equal to half of the period of signal clk 106. Each of the internal clock signals has its rising edge every fourth θ. This is the cycle time interval of the clock generator component 120 and it equals twice the period of signal clk 106. Clkdiv2 which has waveform 222 activates; i.e. has its rising edge, at $\theta_{(i)}$, $\theta_{(i+4)}$, $\theta_{(i+8)}$, and so forth. Clkdiv2shift which has waveform 224 activates at $\theta_{(i+1)}$, $\theta_{(i+5)}$, $\theta_{(i+9)}$, and so forth. The inverse of clkdiv2 activates at $\theta_{(i+2)}$, $\theta_{(i+6)}$, $\theta_{(i+10)}$, and so forth. And, the inverse of clkdiv2shift activates at $\theta_{(i+3)}$, $\theta_{(i+7)}$, $\theta_{(i+11)}$, and so forth.

Referring back to FIG. 5, the internal clocks drive the phase difference logic which computes the following phase differences:

$$\alpha_{(i)} = \theta_{(i+4)} - \theta_{(i)}$$

$$\alpha_{(i+1)} = \theta_{(i+5)} - \theta_{(i+1)}$$

$$\alpha_{(i+2)} = \theta_{(i+6)} - \theta_{(i+2)}$$

$$\alpha_{(i+3)} = \theta_{(i+7)} - \theta_{(i+3)}$$

$$\alpha_{(i+4)} = \theta_{(i+8)} - \theta_{(i+4)}$$

etc. . . .

Phase difference signal $a_{(i)}$ 151 is produced by accumulator 150 subtracting phase signal 105 value at $\theta_{(i+4)}$, held in sample and hold element 141, minus the value stored in delay element 140 which was clocked into the sample and hold element 141 at $\theta_{(i)}$ and transferred to the delay element 140 at $\theta_{(i+4)}$. In a similar way, all the phase differences are computed: $\alpha_{(i+1)}$ 157 from accumulator 156 using delay element 146 and sample and hold element 147, $\alpha_{(i+2)}$ 153 from accumulator 152 using delay element 142 and sample and hold element 143, and $\alpha_{(i+3)}$ 155 from accumulator 154 using delay element 144 and sample and hold element 145. Note that $\theta_{(i+4)}$ is the same as $\theta_{(i)}$, but it occurs one clock generator cycle later. In this specification, $\theta_{(i)}$ is used alternatively to refer to any instance of $\theta_{(i+4)}$, where n is an integer.

The four phase difference signals are inputs to the intermediate averaging component 122 where they are averaged by adding all four values together using accumulators 160, 162, and 164 producing signal 165 which is divided by four using shifter 166 to perform a right shift by two binary digits to produce intermediate averaging component 122 output signal 168.

Using four phase difference signals in the intermediate averaging component 122 is beneficial because it produces a more reliable output value than if fewer no samples were averaged together. This more stable value results in a more accurate frequency correction output FreqCorr 104 and consequently results in fewer lost or erred packets. The more accurate result means that the frequency merge process will proceed more quickly.

The four phase difference signals also are inputs to the threshold detection component 124 and are used to obtain residual differences as follows:

$$\beta(i) = \alpha_{(i+2)} - \alpha_{(i)}$$

$$\beta(i+1) = \alpha_{(i+3)} - \alpha_{(i+1)}$$

etc. . . .

Residual difference signal $\beta(i)$ is produced by accumulator 170 subtracting phase difference signal $\alpha_{(i+2)}$ 153 minus phase difference signal $\alpha_{(i)}$ 151. In a similar way, residual difference signal $\beta(i+1)$ is produced by accumulator 172 subtracting phase difference signal $\alpha_{(i+3)}$ 155 minus phase difference signal $\alpha_{(i+1)}$ 157.

The absolute value of each residual difference is computed by ABS elements 171 and 173, and compared to threshold Thresh 1 using comparator elements 174 and 176. If the absolute value of each residual difference is less than the threshold, the subsequent counters 178 and 180 connected to each comparator respectively are incremented. The counters can only increment if enable signal 110 is active. If comparator 174 or 176 detect that Thresh 1 is equaled or exceeded, then corresponding reset signal 192 or 194 is activated and counter 178 or 180 is reset to zero. The counters 178 and 180 outputs are respectively compared using comparators 182 and 184 with a second threshold Thresh 2. And gate 186 determines if both counter outputs are greater than Thresh 2 and if so it activates signal 196.

Thresholds Thresh 1 and Thresh 2 are configurable. They can be programmed as values stored in registers 80.

Threshold detection component 124 waiting period element 188 receives signal 196 and outputs detect signal 200, which goes active when signal 196 goes active, but remains active for a minimum time interval that is configurable in a register 80. This duration is enforced unless signal PMend 108 goes active in which case the detect signal 200 is immediately deactivated. The minimum time interval will give the phase detector 52 sufficient time to utilize the new FreqCorr signal value 104 that will be generated due to the detect signal 200 going active. The PMend 108 signal serves as an abort signal so that the frequency correction process can be contained to the initial bits in a data stream such as the preamble 42 bits in a received data packet. This improves the accuracy of data reception by preventing the automatic frequency correction process from running during data reception where adjustments to the clocking could lead to higher bit error rates.

In the threshold detection component 124, the comparison of the phase difference signals against threshold 1 detects whether the phase signal 102 is changing steadily over time, i.e. residual differences in phase change are less than Thresh 1. The comparison against threshold 2 check to see if this steady change is consistent. The longer the steady phase change continues, the less likely that the input signal is noise and the more likely that the input is a data preamble. Noise is relatively random and typically causes the phase difference to alternately increase and decrease. The phase would not typically consistently change by equal or nearly equal increments for a noise signal, as is the case when the frequency correction process has real data to merge on. In simulations, the present invention was given only noise as an input signal and the result was no false triggers. When data packets were supplied after the noise, the automatic frequency correction component 100 merged on the signal and received the packet without error in each simulation.

The output filter component 126 serves as a low pass filter that receives the output signal 168 from the intermediate averaging component 122, receives detect signal 200 which it uses as a clock and produces the frequency correction signal FreqCorr 104, which is the ultimate output of the automatic frequency correction component 100. The low pass filter shown in the preferred embodiment of FIG. 5 is an infinite impulse response filter that is built with accumulator 202 and delay element 204. The delay element 204 stores the output value of accumulator 202 each time both are clocked by the detect signal 200. The accumulator 202 adds the output of the intermediate averaging component 122 with the previous value of the accumulator 202 output. The result passes through phase to frequency element 206, which is a multiplier. It scales the signal so that the final output, FreqCorr signal 104 is sized to the correct units. While the preferred embodiment of the invention uses an output low pass filter and multiplier, other embodiments may omit these elements or implement them differently. In one alternate embodiment, the low pass filter is omitted and is effectively a simple pass through function. Other embodiments may use other types of low pass filters or other types of filters entirely.

The following examples further illustrate the invention but, of course, should not be construed as in any way limiting its scope.

EXAMPLE 1

Example 1 is an illustration of an embodiment of the present invention in operation using a specified set of operating parameters. The example is included for educational purposes and selection of a specific embodiment of the invention and specific operating parameters should in no way be construed as limiting the scope of the invention.

In example 1, noise is received followed by one packet. The packet data rate is 100 Kbps and it is signaled at 100 KHz. The automatic frequency correction component 100 begins with frequency correction signal 104 equal to zero. Since the packet to be received is signaled at 100 KHz, the frequency offset is 100 KHz. The objective of the automatic frequency correction component 100 is to estimate the frequency offset so that the wireless receiver system 50 can correct its reception in time for data payload reception.

Figure 7:
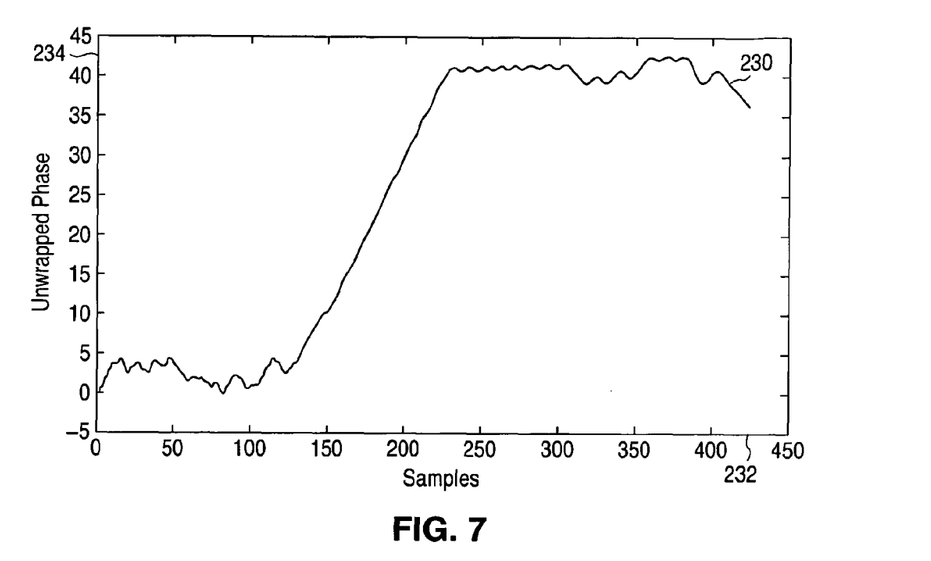
FIG. 7 is a diagram of the unwrapped phase signal waveform that is input to the automatic frequency correction component in example 1.

FIG. 7 is a diagram of the unwrapped phase signal waveform that is input to the automatic frequency correction component at phase signal 102. Only noise is received until about sample 140, and up to that time the phase signal varies up and down. From samples 140 to 300 the preamble is received. In this embodiment, the preamble is bit pattern 1 0 1 0 1 0 1 0 . . . . During reception of the preamble, the phase increases from about zero to about forty. The frequency offset has caused this rapid phase increase. At the point where the phase reached forth, we will see later in the example, the automatic frequency correction component 100 generates the correction on FreqCorr 104, the wireless receiver system 50 corrects its reception and from that point on the phase varies slowly. After sample 300, the synch is received. The example ends here and does not continue with reception of the data payload as this is not of interest to the present invention, which corrects the frequency during reception of the preamble.

Figure 8:
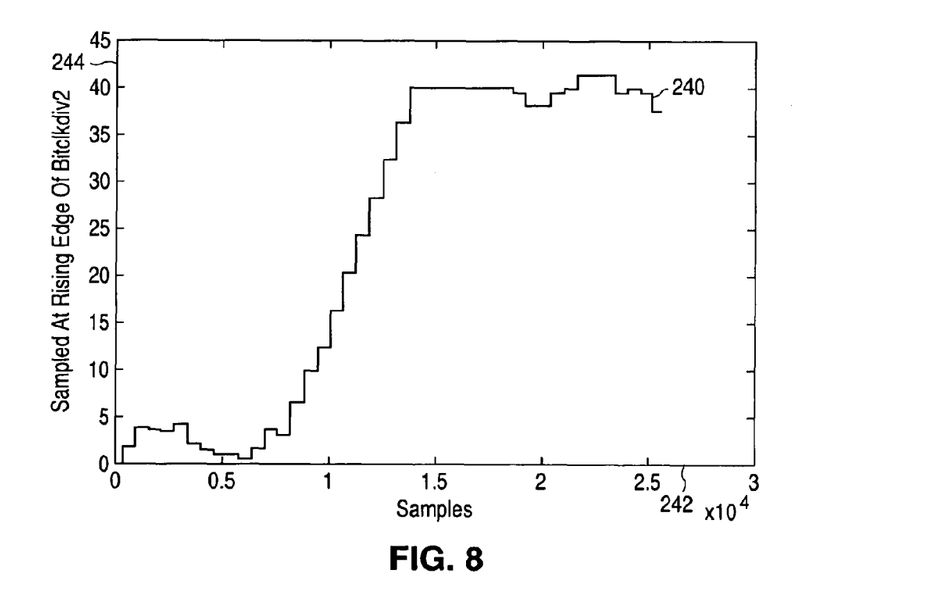
FIG. 8 is a waveform diagram of the unwrapped phase signal 102 after it is sampled by sample and hold element 141 in example 1.

FIG. 8 is a diagram of the unwrapped phase signal 102 after it is sampled by sample and hold element 141. Sample and hold element 141 is clocked by clkdiv2 and the resulting waveform has a "stairs step" quality where each new "step" begins at $\theta_{(i)}$, or $\theta_{(i+4n)}$ where n is an integer. There are similar "stairs step" waveforms (not shown) at the outputs of sample and hold elements 143, 145 and 147 which change value at $\theta_{(i+2)}$, $\theta_{(i+3)}$, and $\theta_{(i+1)}$ respectively or on multiples of the clock generator cycle. The four sampled phase waveforms are skewed slightly in time, and each has a new sample within the width of one "stairs step."

Figure 9:
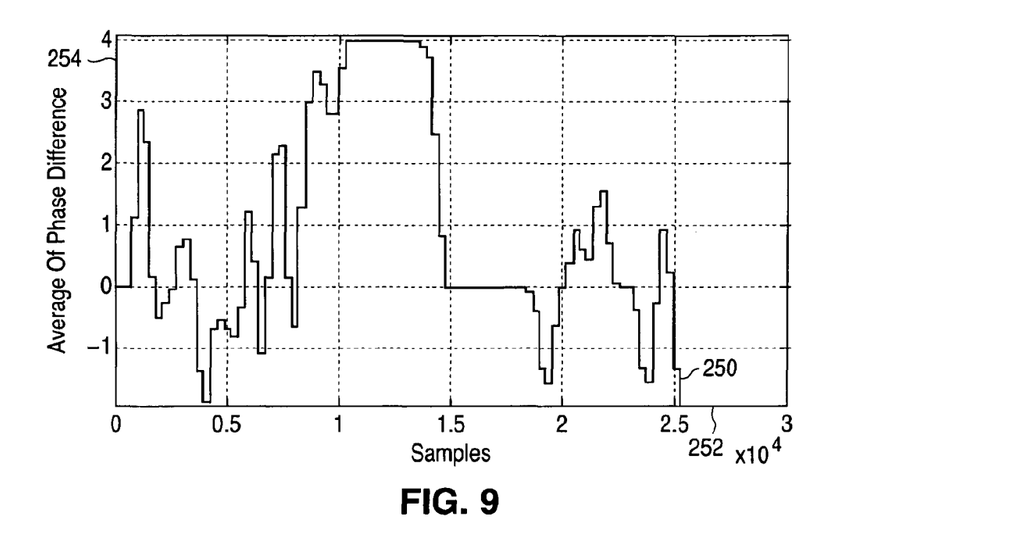
FIG. 9 is a diagram of the output 165 waveform of the intermediate averaging component 122 prior to shifting in example 1.

FIG. 9 is a diagram of the output 165 waveform of the intermediate averaging component 122 prior to shifting; i.e. prior to dividing by 4. It is the average of the four phase differences and it starts to become flat when the preamble is received (at about sample $0.9 \times 10^4$). Before that is fluctuates because it is receiving only noise before the start of the packet. The FreqCorr signal 104 is generates at about sample $1.4 \times 10^4$ (shown later), and that causes the wireless receiver system 50 to correct its reception and the average phase difference drops to zero. This indicates that the merge has completed and receiver is locked in. The phase starts to fluctuate again after the preamble at about sample $2 \times 10^4$, but this is irrelevant since the frequency offset estimation and correction algorithm ends at the end of the preamble.

Figure 10:
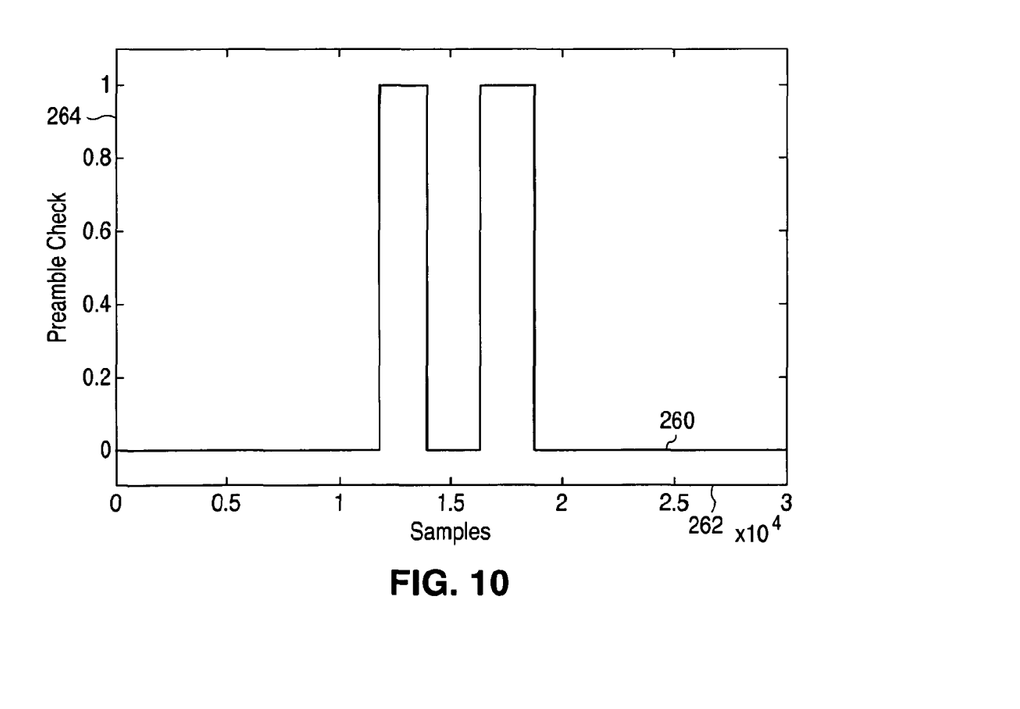
FIG. 10 is a diagram of the output 196 waveform of the threshold detection component 124 prior to the waiting period element 188 in example 1.

FIG. 10 is a diagram of the output 196 waveform of the threshold detection component 124 prior to the waiting period element 188. It goes active when the phase has risen steadily enough for comparators 174 and 176 to observe the phase difference change is less than Thresh 1, and has remained in this state long enough for comparators 182 and 184 to observe that Thresh 2 is exceeded. In FIG. 10, the signal goes active at about $1.2 \times 10^4$, which is a little after the preamble begins. It goes to zero during the transition that is a consequence of the frequency offset correction, and goes active again after the offset correction settles down. It goes back to zero at the end of the preamble. This signal enters waiting block 188.

Figure 11:
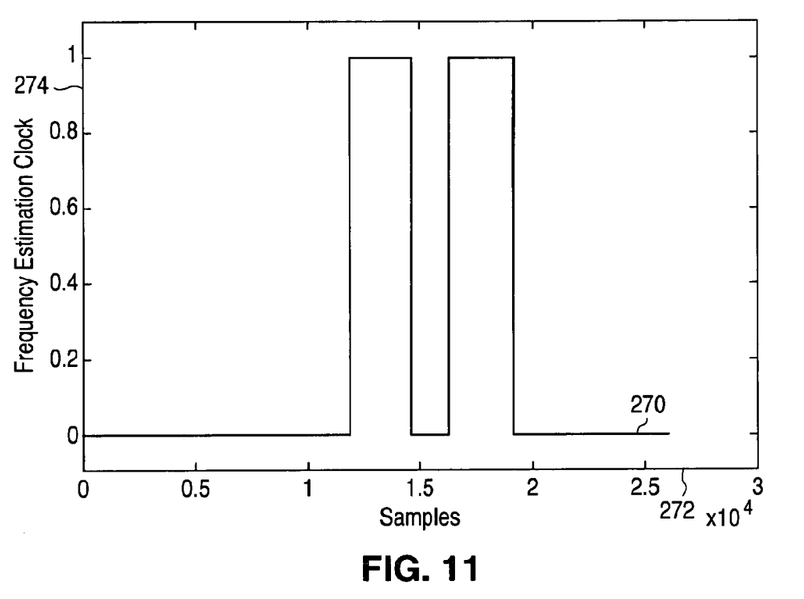
FIG. 11 is a diagram of the detect output signal 200 waveform of the threshold detection component 124 in example 1.

FIG. 11 is a diagram of the detect output signal 200 waveform which is output from waiting block 188 of the threshold detection component 124. It looks very similar to FIG. 10, the waveform before the waiting block. The difference is that the active pulses have been extended for a minimum time interval of N bits where N was configured in a register 80. The pulses are extended to give the wireless receiver system 50 time to correct its reception upon receiving a new value on FreqCorr 104. In this way, the waiting block is designed such that after one frequency correction request, it waits for the phase locked loop to settle down before applying a next correction if required. This approach is optional and it may not be required to wait for the phase locked loop to settle. The waveform of FIG. 11 is used to clock the output of the automatic frequency correction component 100 in the output filter component 126.

Figure 12:
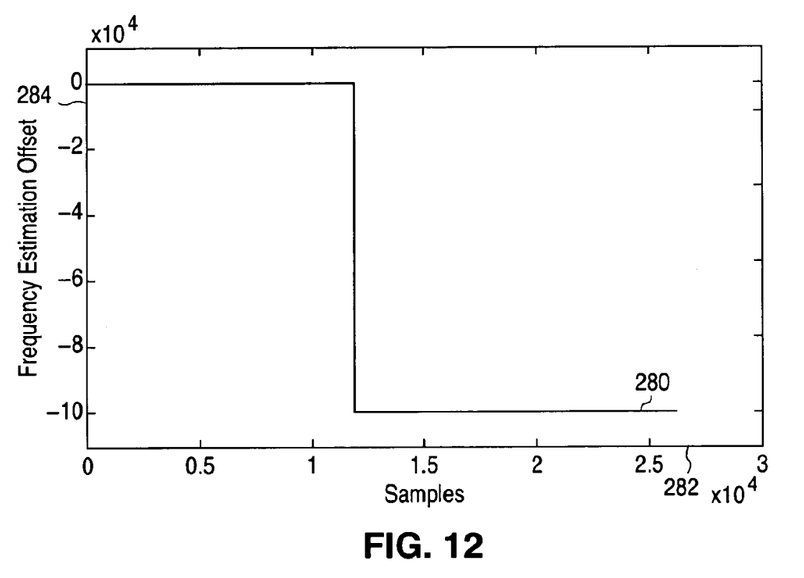
FIG. 12 is a diagram of the frequency correction 104 waveform, which is the output of the automatic frequency correction component 100 in example 1.

FIG. 12 is a diagram of the frequency correction 104 waveform, which is the output of the automatic frequency correction component 100. It transitions at about the same time the detect signal 200 went active; i.e. at about sample $1.2 \times 10^4$ and its value goes from its initial value of 0 to about $-10 \times 10^4$. This is the negative of the initial frequency offset of 100 KHz. It is negative because it has to affect the input data in the opposite direction of the actual offset. The waveform 270 goes active a second time at about sample $1.6 \times 10^4$, and this clocks the output filter and could cause the FreqCorr waveform 280 to change again at that time, but it does not in this example because further correction is not needed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An automatic frequency correction component, wherein a phase signal input to the automatic frequency correction component is converted to a frequency correction signal output, the circuit comprising:

a clock generator circuit configured to convert a received clock signal into a plurality of internal clock signals that operate at a fraction of the rate of the clock signal and are skewed uniformly in time, each of the internal clock signals being separated by a fixed clock time interval, and where a sum of the fixed clock time intervals equals the cycle time interval of the clock generator;

a plurality of sample and hold elements, each receiving one of the plurality of internal clock signals and the phase signal, where the phase signal is sampled responsive to each internal clock signal, to obtain a corresponding plurality of sampled phase signals;

a plurality of delay elements, where each delay element stores one of the plurality of sampled phase signals responsive to a corresponding one of the internal clock signals in order to output a corresponding one of a plurality of delayed phase signals;

a plurality of accumulators, where each accumulator is configured to receive one of the delayed phase signals and a corresponding one of the sampled phase signals and compute a difference responsive thereto in order to output a corresponding one of a plurality of phase difference signals;

an intermediate averaging component configured to receive the plurality of phase difference signals and generate an intermediate average of the phase difference signals responsive to the received clock signal;

a threshold detector configured to receive the phase difference signals, generate a difference between multiple phase difference signals responsive to the clock signal, and compare the difference between multiple phase difference signals to a first threshold in order to detect a series of substantially equal consecutive phase differences and activate a detect signal responsive thereto; and an output filter configured to receive the intermediate average of the phase difference signals and filter the intermediate average responsive to the detect signal in order to generate the frequency correction signal.

2. The automatic frequency correction component of claim 1, where the plurality of internal clock signals comprises four internal clock signals, each clock time interval equals one half a period of the clock signal, and the cycle time interval of the clock generator equals two clock periods.

3. The automatic frequency correction component of claim 2, where each internal clock signal is obtained by dividing one of the clock signal and an inverse of the clock signal by two and outputting one of the divided clock signal and an inverse of the divided clock signal.

4. The automatic frequency correction component of claim 1, where the intermediate averaging component further comprises:

a plurality of accumulator elements configured to sum the plurality of phase difference signals responsive to the clock signal; and a divider configured to divide the sum of the plurality of phase difference signals in order by a number of the plurality of phase difference signals in order to generate the intermediate average of the phase difference signals.

5. The automatic frequency correction component of claim 1, where the threshold detection component is further configured to receive an active abort signal from a controller when reception of a preamble is completed and deactive the detect signal responsive thereto.

6. The automatic frequency correction component of claim 1, where the automatic frequency correction component is coupled to a controller and the first threshold value is stored in a register of the controller.

7. The automatic frequency correction component of claim 1, where the detect output signal minimum activation duration is accomplished in the threshold detection component using a waiting period component that counts the number of cycles of an inverse of the clock signal and holds the detect output signal active during the counting until a count is reached that equals the value in a preconfigured first register, but resets counter and sets the detect output signal to inactive if the received abort signal is activated.

8. The automatic frequency correction component of claim 1, where the threshold detection component determines whether the consecutive phase differences are nearly equal by subtracting one from the next and comparing the absolute value of the result with a first threshold and determining that the first threshold is not exceeded, and by counting the number of consecutive pairs of phase difference for which the absolute value of their difference does not exceed the first threshold and comparing the count with a second threshold and if the second threshold is exceeded, then the detect signal is activated.

9. The automatic frequency correction component of claim 8, where the first threshold is configurable.

10. The automatic frequency correction component of claim 1, wherein the threshold detection component further comprises:

a first accumulator configured to receive a first set of alternating phase difference signals and generate a first difference responsive to the received clock signal;

a second accumulator configured to receive a second set of alternating phase difference signals and generate a second difference responsive to the received clock signal;

a first comparator configured to activate a first counter activation signal when a magnitude of the first difference is below the first threshold and activate a first counter reset signal when the magnitude of the first difference is not below the first threshold;

a first counter configured to continuously increment a first count value responsive to the first counter activation signal and clear the first count value responsive to the first counter reset signal;

a second comparator configured to activate a second counter activation signal when a magnitude of the second difference is below the first threshold and activate a second counter reset signal when the magnitude of the second difference is not below the first threshold;

a second counter configured to continuously increment a second count value responsive to the second counter activation signal and clear the second count value responsive to the second counter reset signal;

a third comparator configured to assert a first count detect signal when the first counter value exceeds a second threshold value;

a fourth comparator configured to assert a second count detect signal when the second counter value exceeds the second threshold value;

a logic gate that combines the first and second count detect signals to generate a counter detection signal;

a waiting period circuit configured to generate the detect signal for a predetermined interval of time responsive to the counter detection signal and the received clock signal.

11. The automatic frequency correction component of claim 10, where the threshold detector is further configured to generate the detect signal by computing residual differences for phase difference signals that are consecutive in time.

12. The automatic frequency correction component of claim 10, where the automatic frequency correction component is coupled to a controller and the second threshold value is stored in a register of the controller.

13. The automatic frequency correction component of claim 1, where the output filter component further comprises:
   an output accumulator configured to receive the intermediate average of the phase difference signals and a delayed sum of the intermediate average signal and generate a sum of the intermediate average signal responsive to the detect signal;
   an output delay element configured to receive the sum of the intermediate average signal and generate the delayed sum of the intermediate average signal responsive to the detect signal; and
   a phase to frequency converter circuit configured to convert the sum of the intermediate average signal to generate the frequency correction signal.

14. The automatic frequency correction component of claim 1, where the output filter component is further configured to low pass filter the intermediate average of the phase difference signals when the output signal is active in order to generate the frequency correction signal.

15. A method for automatic frequency correction, wherein a phase signal input is converted to a frequency correction signal, the method comprising the steps of:
   converting a received clock signal into a plurality of internal clock signals that operate at a fraction of the rate of the clock signal and are skewed uniformly in time, each of the internal clock signals being separated by a fixed clock time interval, and where a sum of the fixed clock time intervals equals twice a period of the received clock signal;
   sampling and holding a phase signal responsive to each of the internal clock signals to obtain a corresponding plurality of sampled phase signals;
   delaying each of the sampled phase signals, where each sampled phase signal is clocked by a corresponding one of the internal clock signals, to produce a corresponding plurality of delayed phase signals;
   subtracting each of the delayed phase signals from a corresponding one of the sampled phase signals to produce a corresponding plurality of phase difference signals;
   generating an intermediate average of the phase difference signals responsive to the received clock signal;
   comparing a magnitude of a difference between multiple phase difference signals to a first threshold responsive to the received clock signal in order to detect a series of substantially equal consecutive phase differences and activate a detect signal responsive thereto; and
   filtering the intermediate average of the phase difference signals responsive to the detect signal to generate the frequency correction signal.

16. The method for automatic frequency correction of claim 15, wherein the step of comparing a magnitude of a difference between multiple phase difference signals to a first threshold responsive to the received clock signal in order to detect a series of substantially equal consecutive phase differences and activate a detect signal responsive thereto further comprises:
   generating a first difference between a first set of alternating phase difference signals responsive to the received clock signal;
   generating a second difference between a second set of alternating phase difference signals responsive to the received clock signal;
   comparing a magnitude of the first difference to the first threshold;
   comparing a magnitude of the second difference to the first threshold;
   monitoring whether the magnitudes of the first and second differences remain above the first threshold for a predetermined time interval; and
   asserting the detect signal for another predetermined time interval when the magnitudes of the first and second differences remain above the first threshold for a predetermined time interval.

17. The method for automatic frequency correction of claim 15, wherein the step of filtering the intermediate average of the phase difference signals responsive to the detect signal to generate an estimated frequency correction signal further comprises:
   summing the intermediate average of the phase difference signals and a delayed sum of the intermediate average signal responsive to the detect signal to generate a sum of the intermediate average signal;
   delaying the sum of the intermediate average signal responsive to the detect signal to generate the delayed sum of the intermediate average signal; and
   phase to frequency converting the sum of the intermediate average signal to generate the frequency correction signal.

18. An automatic frequency correction circuit for converting a phase signal input to a frequency correction signal, the circuit comprising:
   means for converting a received clock signal into a plurality of internal clock signals that operate at a fraction of the rate of the clock signal and are skewed uniformly in time, each of the internal clock signals being separated by a fixed clock time interval, and where a sum of the fixed clock time intervals equals twice a period of the received clock signal;
   means for sampling and holding a phase signal responsive to each of the internal clock signals responsive, where the phase signal is sampled on a rising edge of each internal clock signal, to obtain a corresponding plurality of sampled phase signals;
   means for delaying each of the sampled phase signals, where each sampled phase signal is clocked by a corresponding one of the internal clock signals, to produce a corresponding plurality of delayed phase signals;
   means for subtracting each of the delayed phase signals from a corresponding one of the sampled phase signals to produce a corresponding plurality of phase difference signals;
   means for generating an intermediate average of the phase difference signals responsive to the received clock signal;
   means for comparing a magnitude of a difference between multiple phase difference signals to a first threshold responsive to the received clock signal in order to detect a series of substantially equal consecutive phase differences and activate a detect signal responsive thereto; and
   means for filtering the intermediate average of the phase difference signals responsive to the detect signal to generate the frequency correction signal.

19. The automatic frequency correction circuit of claim 18, wherein the means for comparing a magnitude of a difference between multiple phase difference signals to a first threshold responsive to the received clock signal in order to detect a series of substantially equal consecutive phase differences and activate a detect signal responsive thereto further comprises:

means for generating a first difference between a first set of alternating phase difference signals responsive to the received clock signal;

means for generating a second difference between a second set of alternating phase difference signals responsive to the received clock signal;

means for comparing a magnitude of the first difference to the first threshold responsive;

means for comparing a magnitude of the second difference to the first threshold;

means for monitoring whether the magnitudes of the first and second differences remain above the first threshold for a predetermined time interval; and means for asserting the detect signal for another predetermined time interval when the magnitudes of the first and second differences remain above the first threshold for a predetermined time interval.

20. The automatic frequency correction circuit of claim 18, wherein the means for filtering the intermediate average of the phase difference signals responsive to the detect signal to generate an estimated frequency correction signal further comprises:

means for summing the intermediate average of the phase difference signals and a delayed sum of the intermediate average signal responsive to the detect signal to generate a sum of the intermediate average signal;

means for delaying the sum of the intermediate average signal responsive to the detect signal to generate the delayed sum of the intermediate average signal; and means for phase to frequency converting the sum of the intermediate average signal to generate the frequency correction signal.

* * * * *